United States Patent [19]

Radi

[11] Patent Number: 4,850,256

[45] Date of Patent: Jul. 25, 1989

[54] METHOD FOR MAKING AN ELASTOMERIC RETAINER MEMBER

[76] Inventor: William G. Radi, 6920 Lorain Ave., Cleveland, Ohio 44102

[21] Appl. No.: 137,062

[22] Filed: Dec. 23, 1987

[51] Int. Cl.[4] .................... B23D 21/00

[52] U.S. Cl. .................... 83/17; 83/54; 83/176; 83/178; 83/569; 83/925 EB

[58] Field of Search .................... 83/54, 17, 19, 176, 83/178, 187, 564, 568, 569, 598, 599, 925 EB

[56] References Cited

U.S. PATENT DOCUMENTS

| | | | |
|---|---|---|---|
| 1,214,295 | 1/1917 | Gammeter | 83/17 X |
| 2,240,796 | 5/1941 | Nygard | 83/569 X |
| 3,375,745 | 4/1968 | Kuts | 83/176 |
| 3,678,791 | 7/1972 | Eriksson et al. | 83/176 X |

*Primary Examiner*—Frank T. Yost
*Assistant Examiner*—Eugenia A. Jones
*Attorney, Agent, or Firm*—Watts, Hoffmann, Fisher & Heinke Co.

[57] ABSTRACT

A method for making one or more resilient retainer members, such as rubber bands or the like including providing an oppositely disposed set of upper and lower platen members each having a plurality of cutting elements extending outwardly with the cutting elements being spaced apart to provide a predetermined width for the rubber band, folding the rubber band, and placing the folded rubber band between the platen members so as to cut the rubber band material into a plurality of individual rubber band elements which are of an endless, one-piece construction.

1 Claim, 2 Drawing Sheets

METHOD FOR MAKING AN ELASTOMERIC RETAINER MEMBER

DESCRIPTION

1. Technical Field

The present invention relates to a method for making an elastomeric retainer member, and more particularly relates to a novel method for producing such elastomeric member in the form of a rubber band-like retainer member for the packaging and/or securement of various products.

2. Background of the Invention

Heretofore, it has been known to make elastomeric retainers, such as rubber bands or the like, by methods utilizing some type of fastening or securement means for attaching the free ends of the rubber band together to make the endless product known as the rubber band. Such fastening or securement of the free ends would simply involve the bonding, fusing or vulcanization of the free ends of the rubber band to provide the endless structure. Such prior methods have been satisfactory in producing relatively small size rubber bands and for relatively large volume production applications. Accordingly, such prior methods have not been satisfactory in producing relatively large size (e.g. in excess of 1 foot) diameter rubber bands for relatively heavy duty applications such as in the securement of bales paper, rolls of carpet, the securement of waste disposal bags in garbage cans and other such applications wherein relatively large diameter sizes are required and for relatively heavy duty application. Additionally such prior methods have not afforded the opportunity to produce such relatively large diameter rubber bands having good strength characteristics and from readily available commercial rubber materials, such as from rubber automotive tubes including but not limited to tubes for automobiles, air planes, trucks and the like.

SUMMARY OF THE INVENTION

The present invention relates to a method for making an elastomeric retainer member (rubber band), having an endless body member, the method comprising providing an endless elastomeric tube member, positioning such tube member between upper and lower platen members, the lower platen member supporting a plurality of laterally spaced knife-like cutter elements oriented in a predetermined pattern dependent upon the diameter of the retainer member to be produced, folding said elastomeric tube member at least in half and then placing the tube member, as folded, onto the confronting surface of said knife-like elements, moving one of said platen members relative to the other of said platen members for compressing the material of said tube member so as to cut the material of said tube member in a longitudinal (lengthwise) direction to form an endless elastomeric retainer member, and then moving said retainer member from between said platen members. The invention further contemplates folding the tube member into quarters, eighths or the like so as to produce a retainer member, as finished, with a predetermined diameter. Further, the invention contemplates a predetermined lateral disposition of the knife-like elements so as to provide a retainer member with a predetermined widthwise direction.

By this arrangement, there is provided a novel method of making relatively large size rubber bands having good strength characteristics from standard rubber products such as automotive and truck tires that are readily commercially available and at a substantially reduced cost. In other words, the present invention provides a method that, in effect, achieves an effective reclamation of used commercial products that would otherwise be generally discarded.

Other advantages and objects of the present invention will become apparent as the following description proceeds when taken in conjunction with the following drawings.

DESCRIPTION OF THE PREFERRED EMBODIMENTS

Figure 1:
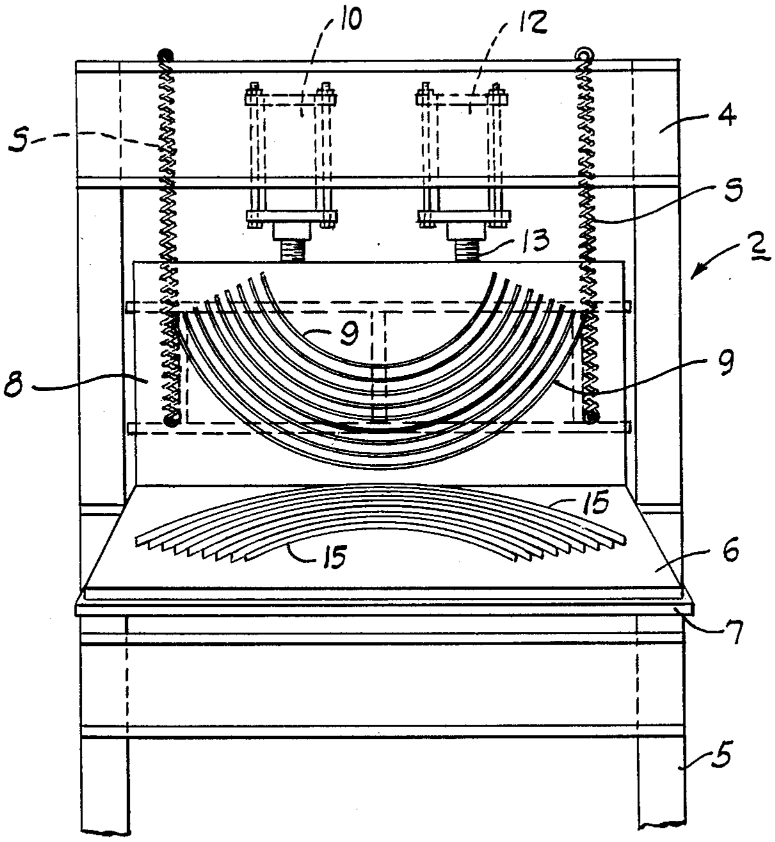
FIG. 1 is a front elevation view illustrating a typical machine in the form of a press having upper and lower platen members for producing the elastic retainer members in accordance with the method of the present invention.
Figure 2:
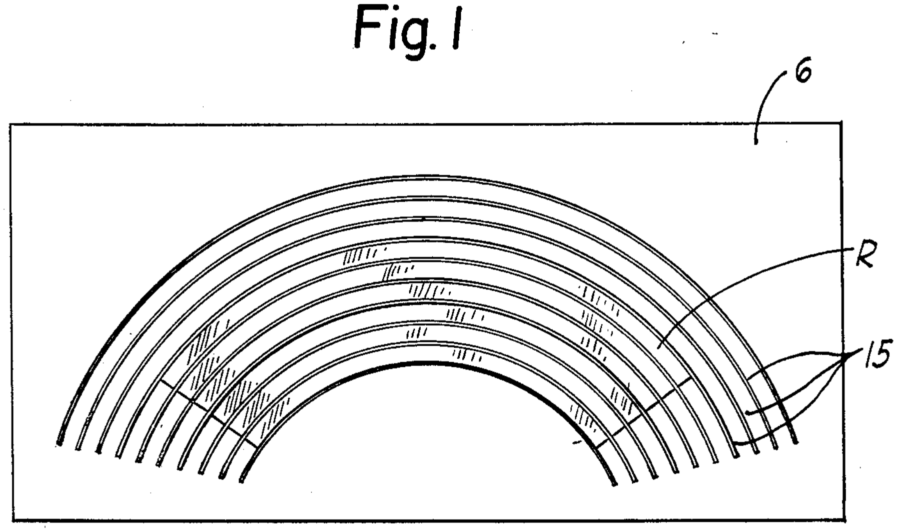
FIG. 2 is a top plan view of the lower section of knife elements in accordance with the invention.

Referring again to the drawings and in particular to FIGS. 1 and 2 thereof, there is illustrated a press machine, designated generally at 2 for cutting an elastomeric member, designated generally at R, such as an automotive rubber inner tube. As shown, the press includes a pair of oppositely disposed support columns 4 having supporting legs 5 which support a base frame 7 which, in turn, supports a lower platen member 6. The machine includes an upper platen member 8 which is pivotally mounted for movement toward and away from the lower platen member 6 upon actuation of hydraulic cylinders 10 and 12. Resilient springs, as at S, are provided to facilitate return move of the upper platen member 8.

Figure 3:
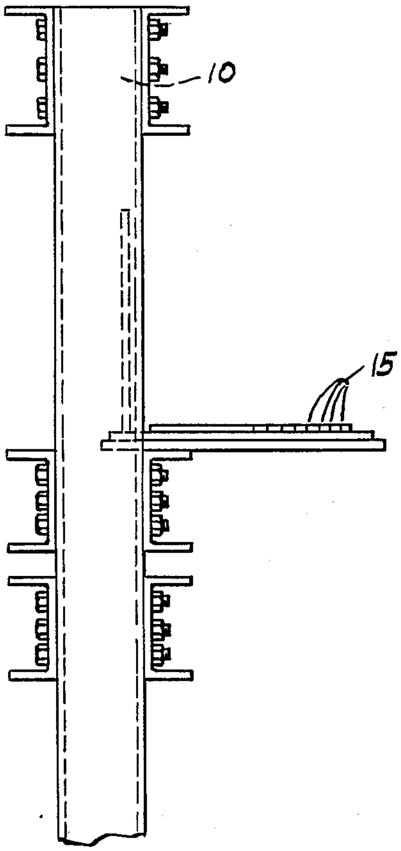
FIG. 3 is a fragmentary, front elevation view of one of the hydraulic cylinders in accordance with the present invention.
Figure 4:
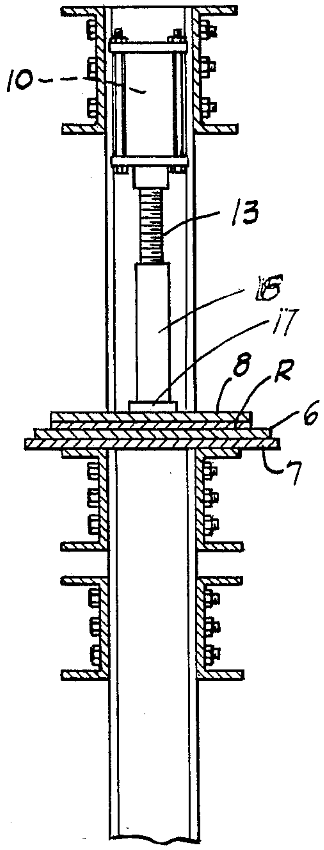
FIG. 4 is a fragmentary, vertical section view of the hydraulic cylinder illustrated in FIG. 3 but with the elastomeric retainer in place between the platens.

As best illustrated in FIGS. 3 and 4, the cylinders 10 and 12 each include adjustment screw members 13 which may be screwed into and out of an internally threaded column, as at 18, for selectively adjusting the vertical height of the column and hence, a foot member 17 which engages the upper platen member 8 thereby to press the upper platen member 8 toward the lower platen member 6.

Figure 5:
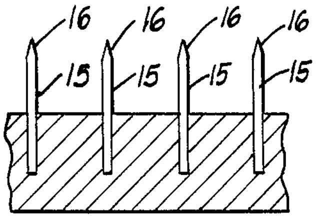
FIG. 5 is a fragmentary section view, on an enlarged scale, illustrating the cutting knife configuration of the invention.
Figure 6:
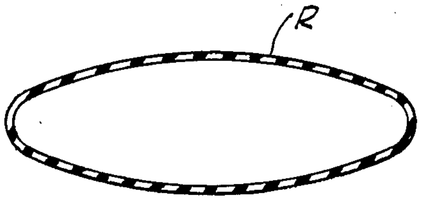
FIG. 6 is a cross-sectional view, on an enlarged scale, showing one of the retainer elements of the invention.

In the invention, the lower 6 and upper 8 platen members each include a series of laterally and symmetrically spaced cutting knifes 9 and 15 in the form of a semi-circular section. As best seen in FIG. 5, the cutting knifes 15, for example, of the lower platen member 6 include a pointed cutting edge, as at 16, to facilitate cutting of the elastomeric material (i.e. rubber) of one of the retainer tubes, as at R. As shown in FIG. 6, the retainer tubes R are initially in the conventional envelope-like form as is the case with conventional type automotive inner tubes.

In the invention, the method of the invention resides in taking a full size inner tube having a 360° configuration and then folding the same in half and placing the folded tube between the upper and lower platens such that upon lowering of the upper platen the material of the tube is severed into a plurality of individual strips with each strip being of a continuous or endless configuration, as illustrated in FIG. 6. Accordingly, these strips then take the configuration of rubber bands which can be readily used in various commerical and industrial applications. If smaller size rubber band-like retainers are desired, the inner tube may then simply of smaller diameter size as desired. Importantly, in the invention the cutting of the inner tubes is such that the cut strip of material is left as a unitary, one-piece strip of material. It will be seen, therefore, that any size and/or number of inner tubes may be employed dependent upon the type and size of retainer desired.

I claim:

1. A method for making one or more resilient retainer members having an endless one-piece construction, said method including providing an oppositely disposed set of upper and lower platen members each having a plurality of laterally and symmetrically spaced cutting elements extending outwardly therefrom, said cutting elements being laterally spaced apart a distance sufficient to provide a predetermined width for the retainer element, folding an elastomeric inner tube into one-half, placing said folded inner tube between the upper and lower platens and closing the upper platen over the lower platen so as to cause the cutting elements to sever the material of said inner tube into a plurality of rubber band-like elements which are of an endless, one-piece construction.

* * * * *